A. W. BEE & I. W. GARRETT.
Automatic Glass Gage-Cock.

No. 167,819.

Patented Sept. 21, 1875.

Witnesses,
Arthur Boswell

Inventors,
Albert W. Bee
I. W. Garrett

UNITED STATES PATENT OFFICE.

ALBERT W. BEE, OF SAN FRANCISCO, CALIFORNIA, AND I. WILSON GARRETT, OF PHILADELPHIA, PENNSYLVANIA.

IMPROVEMENT IN AUTOMATIC GLASS GAGE-COCKS.

Specification forming part of Letters Patent No. 167,819, dated September 21, 1875; application filed March 25, 1875.

*To all whom it may concern:*

Figure 2:
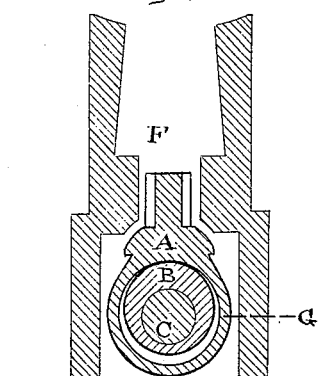
Figure 1:
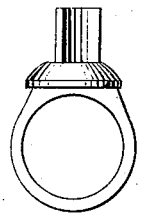
Figure 1:
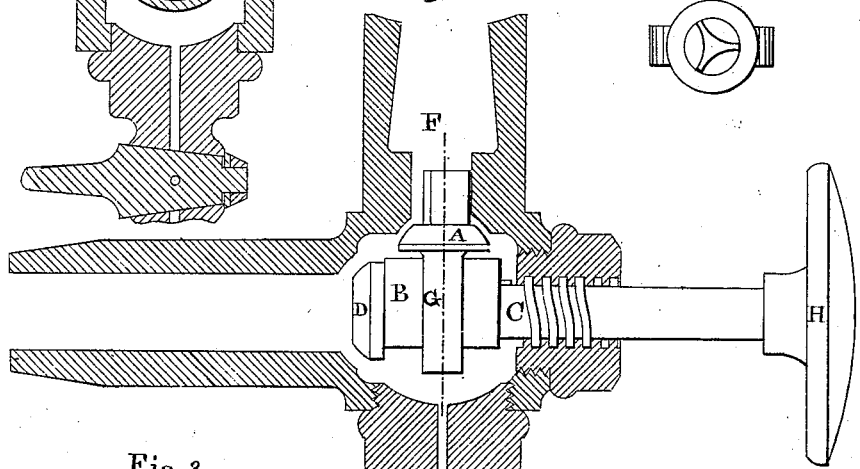
Figure 3:
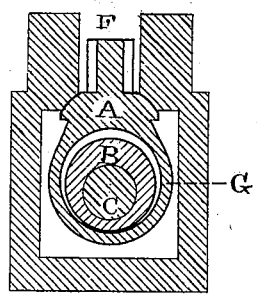

Be it known that we, ALBERT W. BEE, of San Francisco, State of California, and I. WILSON GARRETT, of Philadelphia, Pennsylvania, have jointly invented an Improved Automatic Glass Gage-Cock, of which the following is a specification:

The object of our invention is to obtain a more perfect control over the automatic valve in an automatic glass gage-cock than is done by any existing arrangement, while not abandoning the ordinary screw-valve, and is accomplished by placing on the stem C of the screw-valve D a cam, B, which works in a ring, G, attached to the automatic valve A. The ring G, as will be seen in Fig. 2, is made with an internal diameter sufficiently large to allow the valve A to rise into its seat when the cam B is in the position shown in Figs. 1, 2, and 3. The remaining parts are the same as in the ordinary glass gage-cock.

Figure 4:
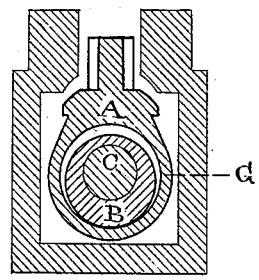

The working is as follows: The lower end of a glass tube is inserted in the opening F, and held steam-tight by a nut and packing, the upper end being similarly inserted in the upper automatic glass gage-cock, which is similar in principle to the lower one. While the glass tube is full of water and steam the weight of the valve A is sufficient to hold it down; but when the glass breaks the rush of water or steam lifts the valve A, closing the opening F, as in Fig. 3. In case of probable leakage, by reason of the deposition of scale on the bearing-surface of the valve A, the ordinary valve D may be immediately closed steam-tight by hand. After the glass is replaced the cam B is turned, by means of the stem C and handle H, into the position shown in Fig. 4, when steam is immediately admitted into the glass tube. The handle H is then reversed, so as to place the cam B as in Figs. 1 and 2.

For convenience, some mark is placed on the handle H to show the position of the cam B to the operator.

We claim as our joint invention—

The combination, in an automatic glass gage-cock, substantially as described, of an automatic valve, with a cam on the stem of an ordinary screw-valve.

ALBERT W. BEE.
I. WILSON GARRETT.

Witnesses:
ANDREW J. BOSWELL,
ARTHUR BOSWELL.